United States Patent [19]
Liu

[11] Patent Number: 6,054,703
[45] Date of Patent: Apr. 25, 2000

[54] SENSING MODULE FOR ACCELERATING SIGNAL READOUT FROM IMAGE SENSORS

[75] Inventor: Dongtai Liu, Fremont, Calif.

[73] Assignee: Syscan, Inc., San Jose, Calif.

[21] Appl. No.: 09/045,509

[22] Filed: Mar. 20, 1998

[51] Int. Cl.[7] .................................................. H01L 27/00
[52] U.S. Cl. ...................... 250/208.1; 348/280; 348/311
[58] Field of Search ...................... 250/208.1; 348/249, 348/280, 303, 311, 312, 322, 317; 358/500

[56] References Cited

U.S. PATENT DOCUMENTS

| | | | |
|---|---|---|---|
| 4,322,752 | 3/1982 | Bixby | 348/312 |
| 4,731,656 | 3/1988 | Dischert et al. | 348/249 |
| 5,148,268 | 9/1992 | Tandon et al. | 348/280 |
| 5,926,215 | 7/1999 | Whipple et al. | 348/280 |

*Primary Examiner*—Stephone Allen
*Attorney, Agent, or Firm*—Joe Zheng

[57] ABSTRACT

The present invention has been made in consideration of accommodating a higher sensor clock signal to increase the pixel readout rate from a regular image sensor and has particular applications to generating high-resolution and high-speed images from scanning objects. The sensing module in the present invention uses a number of readout passages in parallel to produce several segmented outputs from the image sensor and subsequently combine the outputs to produce an interleaved scanning signal under a sequence of control signals derived from a sensor clock signal.

18 Claims, 6 Drawing Sheets

SENSING MODULE FOR ACCELERATING SIGNAL READOUT FROM IMAGE SENSORS

FIELD OF INVENTION

The present invention relates to monochrome and color scanning systems and more particularly relates to a scanning mechanism for producing multiple outputs in parallel from corresponding multiple sensing segments and combining the multiple outputs thereafter to increase signal readout rate from the scanning mechanism.

DESCRIPTION OF THE RELATED ART

There are many applications that need optical scanners to convert paper-based objects, such as texts and graphics, to an electronic format that can be subsequently analyzed, distributed and archived. One of the most popular optical scanners is flatbed scanners that convert objects, including pictures and papers, to images that can be used, for example, for building Web pages and optical character recognition. Another emerging optical scanner is what is called sheet-fed scanners that are small and unobtrusive enough to sit between a keyboard and a computer monitor or integrated into a keyboard to provide a handy scanning means. Most optical scanners are referred to as image scanners as the output thereof is generally in digital image format.

An image scanner generally includes a sensing module that converts scanning objects optically into electronic images. The sensing module comprises an illumination system, an optical system, an image sensor and an output circuit. The illumination system is used to illuminate an object that is being scanned. The optical system is used to direct and focus the light reflected from the scanning object onto the image sensor. The image sensor comprises a plurality of photodiodes or photocapacitors, referred to as photodetectors hereafter, that are sensitive to light and produce proportional pixel signals accordingly. Therefore corresponding pixel signals are produced in the image sensor when the reflected light is focused thereon and the output circuit is used to convert the pixel signals to an appropriate format to be processed or stored in subsequent systems.

The image sensor is generally in the form of Complementary Metal-Oxide Semiconductor (CMOS) or charged couple device (CCD) and fabricated in either a one-dimensional array or two-dimensional array. The operation of the image sensor often comprises two processes, the first being the light integration process and the second being the readout process. In the light integration process, each photodetector captures the incident photons of the reflected light and records the total amount of these photons as a charge or pixel signal. After the light integration process the photodetector is masked so that no further photons are captured and meanwhile the photodetectors start the readout process during which the pixel signal stored in each photodetector is individually readout, via a readout passage, to a data bus or video bus. The readout passage is an intermediate process that transports the pixel signals to the data bus. To be more specific, in the case of CMOS, the readout passage is a switch array comprising a plurality of readout switches, each responsible for coupling one of the photodetectors to the data bus. The pixel signals in the photodetectors are readout, by turning on sequentially the readout switches, to the data bus. If there are N photodetectors in the image array, hence N readout switches in a readout passage, and it takes one clock cycle of a sensor clock signal to turn on one switch and read out one pixel signal onto the data bus, it will consequently take N clock cycles of the sensor clock signal to read out all of the N pixel signals. In the case of CCD, the readout passage is a shift register. The shift register comprises the same number of memory cells as the number of photodetectors in the image sensor, each memory cell holding one pixel signal from a respective photodetector. The pixel signals are dumped into the shift register coupled thereto in parallel. Then the pixel signals in the shift register are serially shifted out, one pixel at a time from one memory cell to another, from the register into the data bus. In other words, if there are N photodetectors in the image array and it takes one clock cycle to read out one pixel signal, it will then take N clock cycles of the sensor clock signal to read out all of the N pixels. In reality, N is generally a large number and the readout time is proportional to N. To increase the pixel signal readout, an often used approach is to increase the clock cycle of the sensor clock signal.

Many flatbed and sheet-fed scanners use one-dimensional image sensor. This requires either the image sensor or the scanning object to move against each other so as to get the scanning object completely scanned. If the scanning object is a piece of paper having the standard size of 8.5 inch by 11 inch and the resultant image resolution is 300 dot-per-inch (dpi), N will be required to be at least 2550 or larger if the paper margins are considered. When the scanners are capable of reproducing color, the same scanning object has to be scanned multiple times, the readout time can be much prolonged. For example, a contact image sensor module SV351A4C from Scan Vision Inc. takes 1.5 msec to scan a line of 9 inch wide at 300 dpi for a gray image but 7.5 mesc to scan the same for a color image. If a scanning object has a long size, the time accumulated for a whole image thereof can be significant. Although the readout time may be reduced by increasing the clock cycle of the sensor clock signal, the readout speed is eventually limited by the internal mechanism of the readout passage. It is well understood in semiconductors that a large number of readout switches in parallel inherently form a capacitor with large capacitance, which significantly retards the charging speed in a following signal amplifier when the pixel signals are readout to be strengthened by the signal amplifier. Similarly a large number of memory cells in a shift register may cause the pixel signals to degrade in shifting from one memory cell to another. There is thus a great need for a sensing module that can accommodate a sensor clock signal having higher clock cycle to increase the readout rate without demanding for costly high speed image sensors.

SUMMARY OF THE INVENTION

The present invention has been made in consideration of the above described problems and has particular applications to high-resolution scanners. The disclosed invention yields significant improvement in the pixel readout time when a high clock cycle signal is applied to produce a high-resolution image of scanning objects. Current marketed scanners begin to experience noticeable delay when the image resolution reaches a certain value in spite of high clock cycle signal applied due to the internal mechanism of the readout passage in the sensing module. The sensing module in the present invention uses a number of readout passages in parallel to concurrently produce several segmented outputs from the image sensor and subsequently combines the outputs to produce an interleaved scanning signal under a sequence of control signals derived from the sensor clock signal. The composition of the several parallel segmented outputs using the timing in the sensor clock signal is a radical shift from the traditional readouts in image sensing module and imposes no additional demand for an even higher sensor clock signal while the signal readout rate thereof is significant increased.

The disclosed sensing module comprises an image sensor generating pixel signals, a number of readout passages to generate segmented scanning signals from the pixel signals, a multiplexer to combine the segmented scanning signals and a timing control circuit that generates a number of control signals derived from a sensor clock signal. The image sensor comprises a plurality of photodetectors and is preferably equally divided into virtual groups; pixel signals in each of the virtual groups are readout by one of the readout passages concurrently. According to one aspect of the present invention, the readout passages are switch arrays coupled to local video buses, each of the switch arrays having a plurality of readout switches and each of the readout switches couples respectively one photodetector to the respective local video bus. Controlled by the sequence of the control signals, the readout switches in each of the switch arrays are successively turned on, namely permitted for passing therethrough, to readout respective pixel signals in the photodetectors in one virtual group at the clock cycle rate of the control signals to the respective local video bus to produce one segmented scanning signal. All the segmented scanning signals are then multiplexed by the multiplexer to subsequently generate an interleaved scanning signal.

According to another aspect of the present invention, the readout passages are shift registers. Each of the shift registers comprises a plurality of memory cells and the number of the memory cells in each of the shift registers is the same as the number of the photodetectors in each virtual group. The pixel signals in the photodetectors in each of the virtual groups are dumped respectively to the memory cells and then start to shift out, from one cell to another in each of the shift registers to concurrently produce a segmented scanning signal and thus there are the same number of the scanning signals as the number of the shift registers. The multiplexer receives each of the scanning signals from the shift registers and multiplexes, under the control of the timing control circuit, the scanning signals sequentially and produces a complete interleaved scanning signal.

In addition, an order circuitry reorders the pixels in the interleaved scanning signal to a normal scanning signal.

According to one embodiment of the present invention, the sensing module for accelerating signal readout rate comprises:

an image sensor;

a timing circuit, in response to a clock signal having a clock cycle T, producing a plurality of control signals;

a number of readout passages, coupled to the image sensor and producing the same number of segmented scanning signals, each of the readout passages respectively and independently controlled by one of the control signals and producing one of the segmented scanning signals;

a multiplexer having the number of inputs, each of the inputs respectively, receiving one of the segmented scanning signals and the multiplexer, in response to the clock signal, successively sampling the segmented scanning signals to produce an interleaved scanning signal.

Accordingly, an important object of the present invention is to provide a generic solution for increasing the capability of a regular image sensor to accommodate a higher clock signal so as to increase the signal readout rate from the image sensor.

Other objects, together with the forgoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

PREFERRED EMBODIMENT—DESCRIPTION

Figure 1:
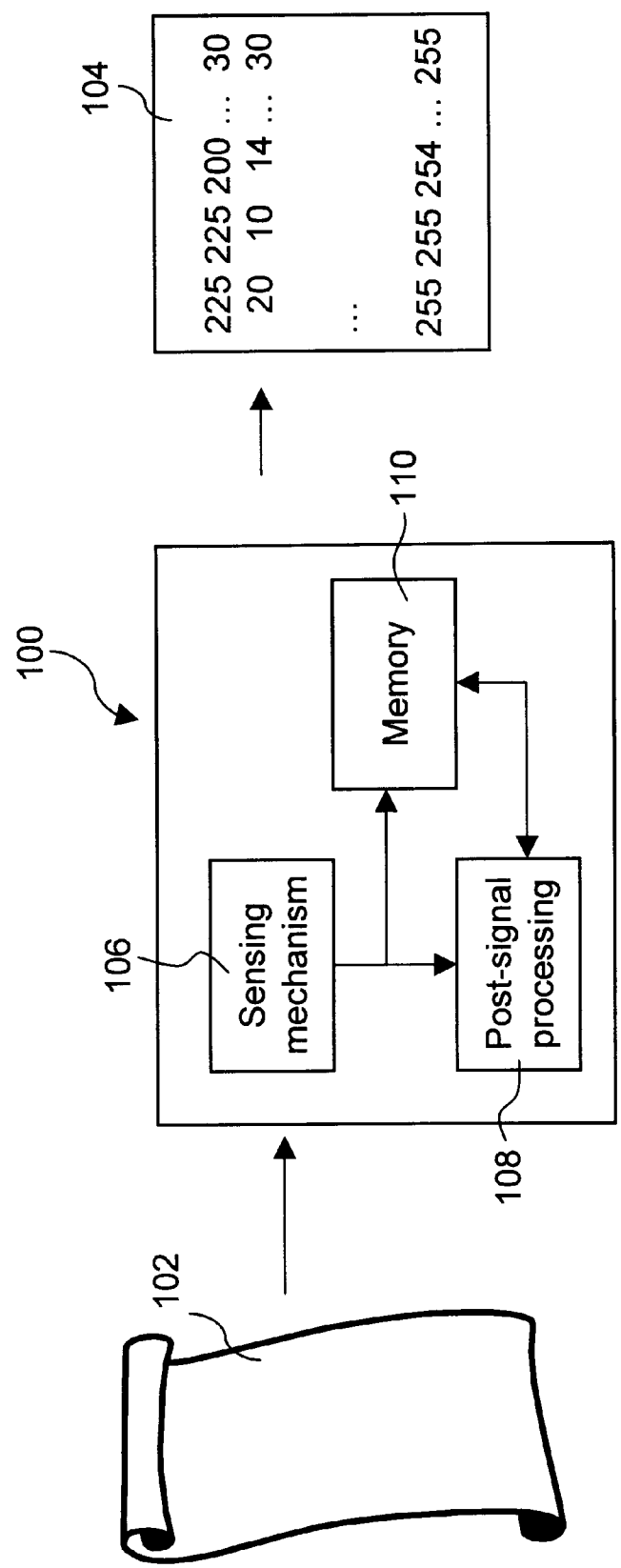
FIG. 1 shows a systemic diagram of a configuration in which the present invention may be practiced.

Referring now to the drawings, in which like numerals refer to like parts throughout the several views. FIG. 1 shows a systemic diagram of a configuration in which the present invention may be practiced. Referenced by 100 is a process or scanner that coverts a paper-based scanning object 102 to a corresponding image 104. The paper-based scanning object 102 may be a piece of paper containing blackandwhite or colorful printed information such as text, graphics, tables and etc. The image 104 comprises a plurality of pixels, each pixel represented by a numerical value representing the intensity of the light reflectance falling on a sensor in the scanner 100 from a corresponding dot in the scanning object 102. For example, the paper-based scanning object 102 is a 8.5 inch by 11 inch paper, the resultant image 104 has a size of 850 by 1100 pixels and is in 8-bit format, that means each inch square of the scanning object 102 is represented by 100 by 100 pixels. If all the pixels in the inch square are 255, the corresponding inch square in the scanning object 102 is white and oppositely if all the pixels in the inch square are 0, the corresponding inch square in the scanning object 102 is dark. It can be understood that any pixels having a value between 0 and 255, i.e. the gray scale, represent the variations of contents in the scanning object 102. When the scanner 100 is capable of reproducing colors, the image 104 comprises 3 individual gray scale images, each generally representing red, green and blue intensity. In other words, each dot in the scanning object 102 is represented by a 3-intensity-value matrix, such as [23, 45, 129]. The scanner 100 comprises a sensing module 106, a postsignal processing circuitry 108 and a working memory 110. The present invention is preferably embodied in the sensing module 106 therefore other processes or hardware in the scanner 100 are not to be described in detail to avoid unnecessarily obscuring aspects of the present invention.

Figure 2:
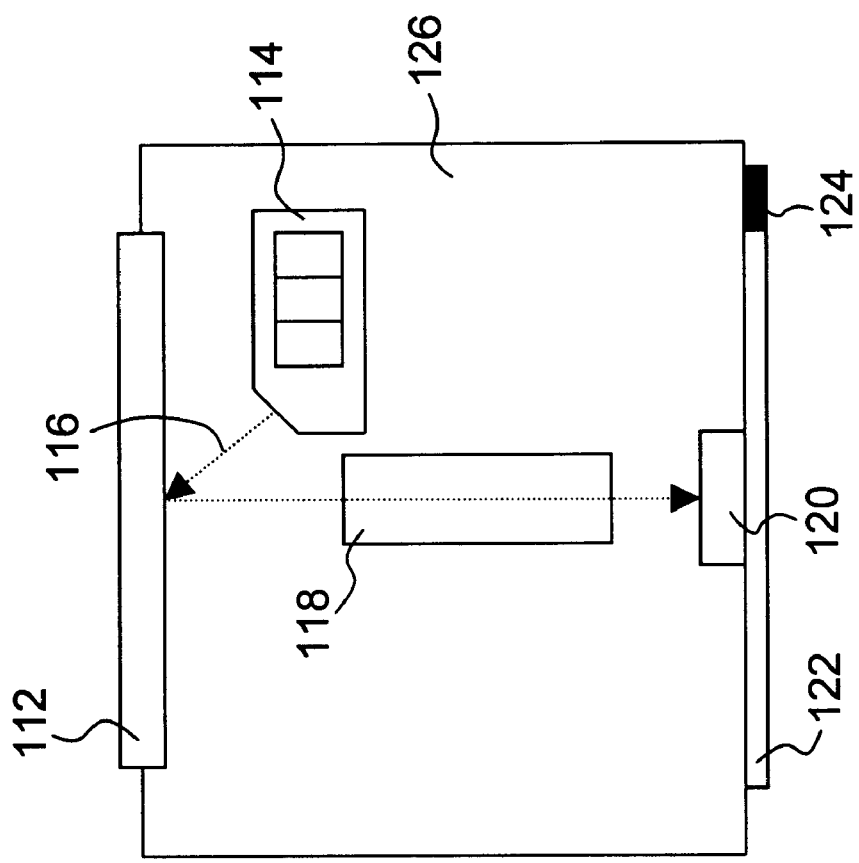
FIG. 2 illustrates a cross section view of one embodiment of the sensing module.

Referring now to FIG. 2, there is shown a cross section view of a typical sensing module. A color light source 114 provide 3 different illuminations, e.g. red, green, and blue lights, to the scanning object over the cover glass 112. The scanning object, not shown in the figure, may be a sheet of paper placed face down on the cover glass 112 such that the scanning side is illuminated by the light source 114. The cover glass 112 is transparent and provides a focus means for the paper to be properly scanned. When the light source 114 emits light onto the paper as indicated by 116, the light reflected from the paper through the cover glass 112 is directed at the optical lens 118 which is generally an array of one-to-one erect graded index micro (cylindrical or rod) lens. It should be understood that the present invention is independent of the optical lens and the light source. The use of the particular light source and the lens array in this configuration facilitate the description of the present invention and impose no limitation thereof. Under the optical lens 118, there is an image sensor 120 comprising an array of photodetectors made of CMOS or CCD sensors. The array can be configured as one-dimensional array or two-dimensional array, often referred to linear sensor or area sensor respectively. It should be noted that the following description is based on the linear sensor, those skilled in the art will appreciate that the principles of the present invention can be equally applied to the two-dimensional array as well. The optical lens 118 collects the reflected light onto the photodetectors that convert the reflected light to electronic signals proportionally representing the intensity of the reflected light. The electronic signals are then transferred to the data bus 122 that is coupled to the memory device 110 through the connector 124.

For the paper over the cover glass 112 to be completely scanned, the paper and the image sensor 120 has to move against each other. In the flatbed scanners, the paper is held still while the image sensor is driven to move along the paper at a fixed speed. In the sheet-fed scanners, the image sensor 120 is held still and the paper is rolled along the image sensor at a fixed speed. In both cases, the motion is performed by a moving mechanism, not shown in the figure, that determines the scanning resolution. In other words, the moving speed is conformed to the image vertical resolution in the resultant image and hence synchronized by a sensor clock signal that may be generated from an oscillator.

When a line of the paper is being scanned, the paper on the cover glass 112 is kept still. After one line is scanned, the paper is advanced one scan line by the moving mechanism. The moving distance depends on the vertical resolution. When a color image is generated, the light source 114 first emits a red light. This red light is directed at the paper and the reflected light is focused onto the image sensor 122 by the optical lens 118. The image sensor 122 integrates the reflected light and generates a sequence of pixel signals, each representing a pixel value. The pixels are then sequentially readout, one at a time, to the data bus 122 and the connector 124 to the memory device, such as the memory 10 in FIG. 1. The readout process will be described in more detail in the following. After the scanning process for the red light is finished, the same process is repeated respectively for the green light and blue light.

Figure 3:
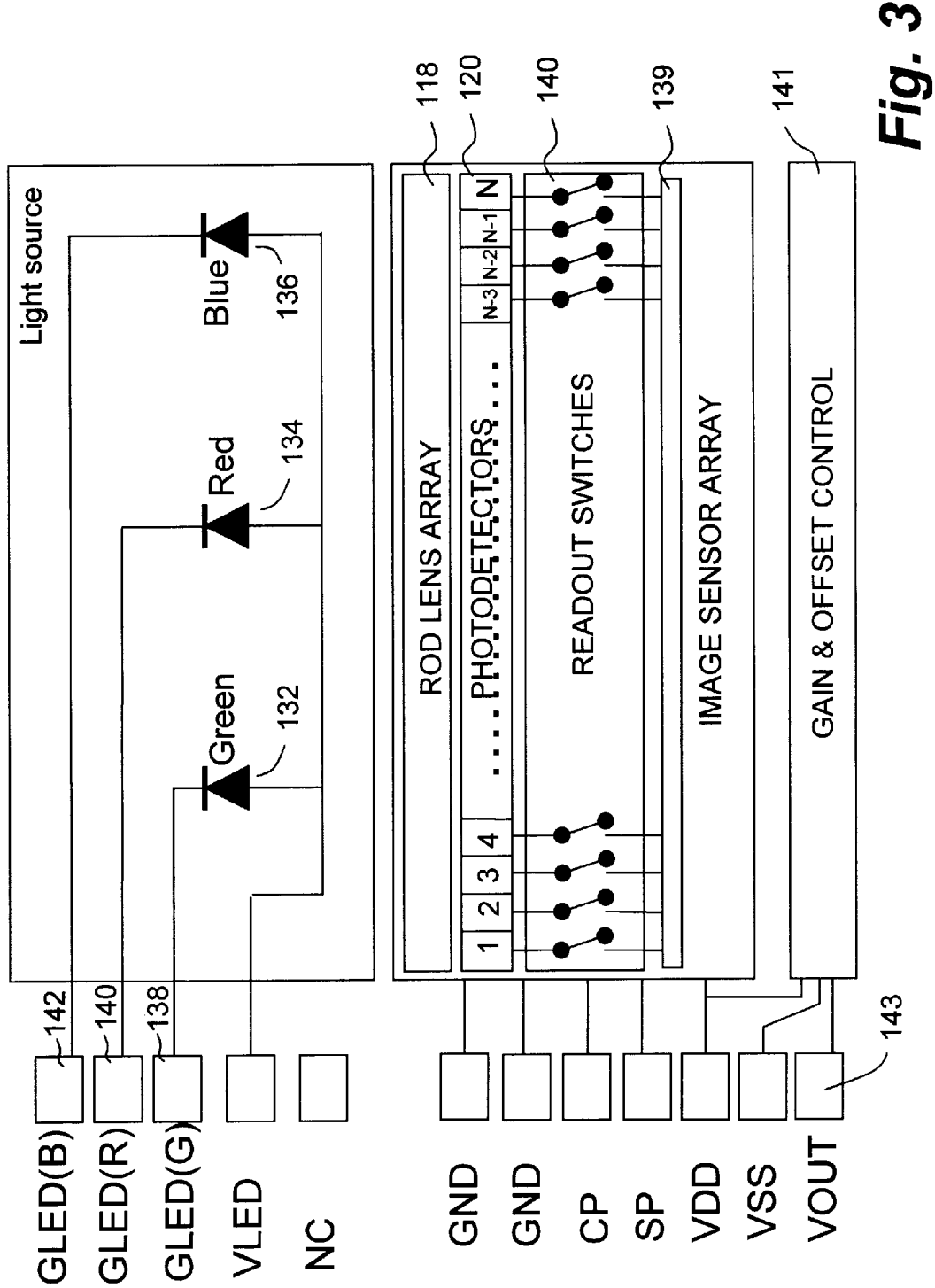
FIG. 3 depicts the block diagram of one embodiment of the sensing module capable of reproducing colors in scanning objects.

It can be appreciated that the pixel readout time could be considerably lengthy if the image sensor has a larger number of photodetectors, hence the larger number of pixels in one scanning line. To fully understand the principles of the present invention, FIG. 3 shows the internal functional diagram of the sensing module. According to one embodiment of the present invention, the light source 114 comprises three light emitting diodes (LED), each being a green 132, a red 134 and a blue 136 diode, respectively and controlled individually and successively by an "ON" signal at respective connectors 138, 140, and 142. The green 132, red 134 and blue 136 diode is turned on when the "ON" signal, often an appropriate voltage, is applied to the respective connectors 138, 140, and 142, wherein three intensity images, representing the red, green and blue components in the scanning object are so generated. For a monochrome scanning, only one of the LED diodes, preferably the green one, is turned on such that only one intensity image is generated. The rod lens array 118 collects the reflected light from the scanning object and focus it onto the image sensor 120 underneath. The image sensor 120 comprises, for example, N photodetectors. Each of the photodetectors collects light cast thereon during each integration process and generates a pixel signal. Upon the completion of the integration process, the pixel signals, each respectively generated by one of the photodetectors, are sequentially readout to the video bus 139 as a scanning signal via the readout switch array 140. The switch array 140 comprises the same number of the readout switches as the number of the photodetectors in the image array 120. It is understood to those skilled in the art that each of the readout switches may be implemented by a diode that becomes on or "passing through" when a proper voltage is applied across. As shown in the figure, the scanning signal is coupled to a gain & offset control circuit 142. The scanning signal is processed, including amplified and offset, in the gain & offset control circuit 142 with respect to a desired adjustment.

It can be readily appreciated that the switch array 140 may be replaced by a shift register when the image sensor is CCD. The shift register comprises the same number of memory cells as the number of the photodetectors 120. Upon the completion of the integration process, the pixel signals are serially shifted out, one pixel signal at one clock cycle from one memory cell to another, subsequently to produce a scanning signal in the video bus 139.

Figure 4:
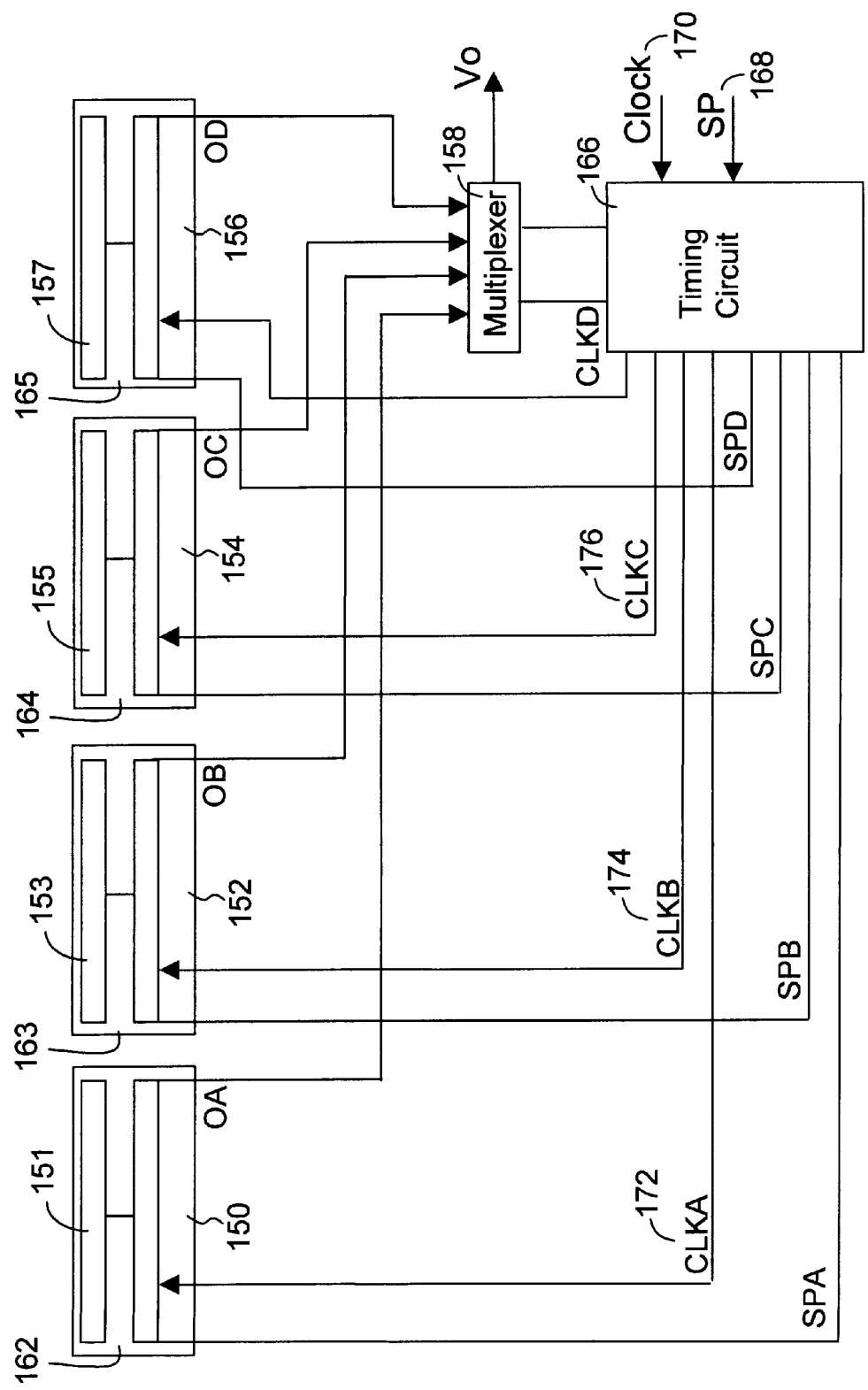
FIG. 4 depicts a PCB level implementation of the disclosed sensing module.

FIG. 4 shows one embodiment of the present invention at printed circuit board (PCB) level and should be understood in conjunction with FIG. 3. Referenced by 162, 163, 164 and 165 are four readout passages, each comprising a local video bus 150, 152, 154 or 156 and a switch array 151, 153, 155 or 157. Each of the four readout passages is responsible for reading out the pixel signals in one portion of the image sensor. In other words, the image sensor is virtually, preferably equally, divided into four groups, or virtual groups, each of which is coupled to one of the readout passages and hence the video buses 150, 152, 154 or 156 are referred to as the local buses. The four local video buses 150, 152, 154 and 156 concurrently generate four respective segmented scanning signals that are to be combined to produce an interleaved scanning signal at the regular video bus, such as the one referenced by 139 in FIG. 3.

The four readout passages 162, 163, 164 and 165 may also be implemented using four shift registers in the case of CCD. To avoid unnecessarily obscuring aspects of the present invention, the following description of the figure is based on the case of CMOS using the local video buses and the switch arrays, those skilled in the art will understand that the description below is equally applied to the shift registers in CCD case.

Each of the four readout passages 162, 163, 164 and 165 can be respectively represented by FIG. 3 and the operation thereof has been described. Each of the local video buses 150, 152, 154 and 156 is coupled to a respective switch array that preferably comprises an equal number of readout switches therein. For example, there are M readout passages, each of the M readout passages comprising K readout switches so that K times M is equal to the total number of the photodetectors in the image sensor. To be more specific, if the image array comprises 2700 photodetectors and four readout passages are used, each of the four switch arrays will have 675 readout switches, therefore each of the photodetectors is coupled exactly to one readout switch. It should be understood by those skilled in the art that the image sensor virtually divided into four groups, hence four switch arrays and four local buses herein, is not an implied limitation of the present invention, rather they are used in a specific embodiment illustrated herein to describe the present invention.

When the image sensor starts the readout phase, all the charges in the photodetectors are concurrently readout to the four local buses via the readout switches and each of the local video buses generates respectively a segmented scanning signal OA, OB, OC or OD. The four segmented scanning signals OA, OB, OC and OD, representing four consecutive segments of a scanning signal, are connected to a multiplexer 158 that is used to sequentially multiplex the four segmented scanning signals OA, OB, OC and OD and produce an interleaved signal Vo that goes to the regular video bus and coupled to the gain & offset control circuit, not shown in this figure.

Figure 5:
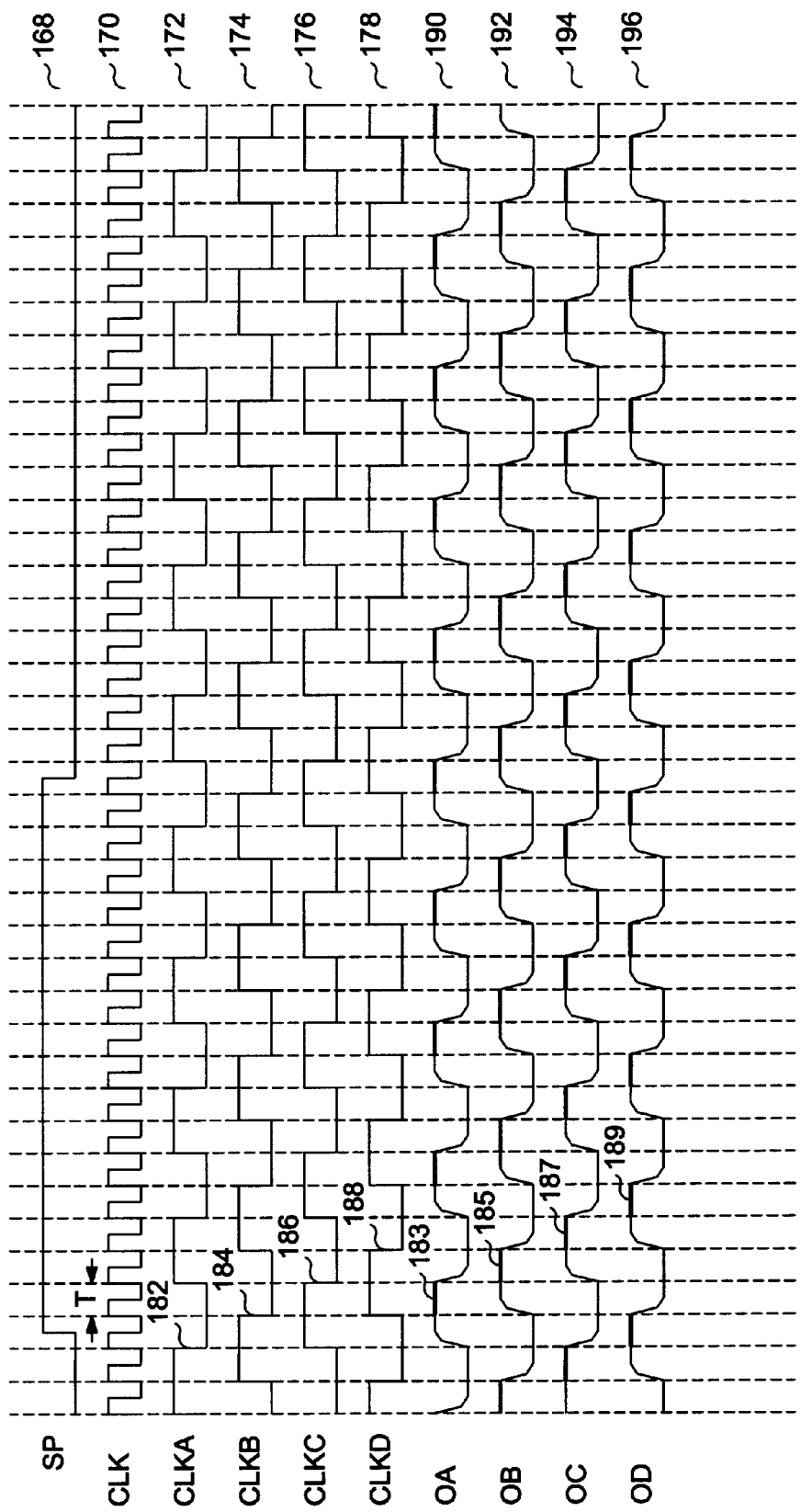
FIG. 5 illustrates a set of wave signals including four control signals derived from a sensor clock signal and four corresponding segmented outputs from four local video buses.

Prior to describing how the four segmented scanning signals OA, OB, OC and OD are multiplexed to produce the interleaved signal Vo, it is necessary to describe four control signals, each derived from a sensor clock signal, to control the four local video buses 150, 152, 154 and 156. FIG. 5 shows a set of signal waves. Referenced by 170 is the sensor clock signal having a clock cycle T. It is understood to those skilled in the art that the sensor clock signal 170 may be drew from an oscillator circuit in a scanner. Control signals, CLKA 172, CLKB 174, CLKC 176 and CLKD 178 are derived from the sensor clock signal 170 and each is orderly delayed by a clock cycle T as indicated by the downward edges 182, 184, 186 and 188. It is further indicated in the figure that each clock cycle in the controls signals are four times of that in the sensor clock signal 170. The timing circuit 166 in FIG. 4 receives the sensor clock signal 170 and produces the control signals, CLKA 172, CLKB 174, CLKC 176 and CLKD 178. It is understood to those skilled in the art that many commercially available counters can be used to implement the timing circuit 166 and preferably implemented in an application specific integrated circuit (ASIC). Referenced by 190, 192, 194 and 196 are the respective segmented scanning signals from the four local buses 150, 152, 154 and 156 in FIG. 4. The four switch arrays 151, 153, 155 and 157, each respectively in response to the downward edges in the respective control signals, CLKA 172, CLKB 174, CLKC 176 and CLKD 178, one such edge in each of the control signals being indicated by 182, 184, 186 and 188, turn on one readout switch therein to readout a pixel signal from a respective photodetector to the respective local buses 150, 152, 154 and 156, resulting in four respective segmented scanning signals 190, 192, 194 and 196. The pixel signal readout time, i.e. the time it takes to produce a segmented scanning signal, is the time it takes to successively turn on all the readout switches in a switch array regardless of the number of the switch arrays.

Returning to FIG. 4, the timing circuit 170 generates the four control signal, CLKA 172, CLKB 174, CLKC 176 and CLKD 178, each respectively and independently controlling the operations of the four switch arrays. In addition, the timing circuit 170 passes the sensor clock signal 170 to control the operation of the multiplexer 158. For every rising edge in the sensor clock signal 170, the multiplexer samples one of the four arrived scanning signals OA, OB, OC and OD. For example, the scanning signals OA, OB, OC and OD are successively sampled at 183, 185, 187 and 189 in FIG. 5 at the rate of T. It can be now appreciated that the readout rate of the pixel signals from the four local video buses remains the same as each cycle T and still produces one pixel signal, yet the capacitance of the inherent capacitor resulting from each switch array has been significantly reduced, which makes it possible to apply a higher system clock to further increase the pixel readout rate from the image sensor. Generally, if there are N number of photodetectors in the image sensor and M switch arrays, each of the M switch arrays equally comprising K readout switches and K=N/M, are used to accommodate the pixel signals from the photodetectors, the readout rate can be potentially improved by M times if a higher sensor clock signal with a cycle of T/M is applied, without requiring a high-speed image sensor. In other words, with the present invention, a regular image sensor can now be used to accommodate the higher sensor clock signal.

It should be appreciated by those skilled in the art that the readout passages 162, 163, 164 and 165 may be implemented using four shift registers. Each of the registers comprises the same number of memory cells as the photodetectors in each of the virtual groups of the image sensor. Instead being readout through an array of readout switches, the pixel signals are dumped to the memory cells and then readout by shifting, one pixel signal at a time, to the data bus to produce the segmented scanning signal OA, OB, OC and OD, respectively.

Figure 6:
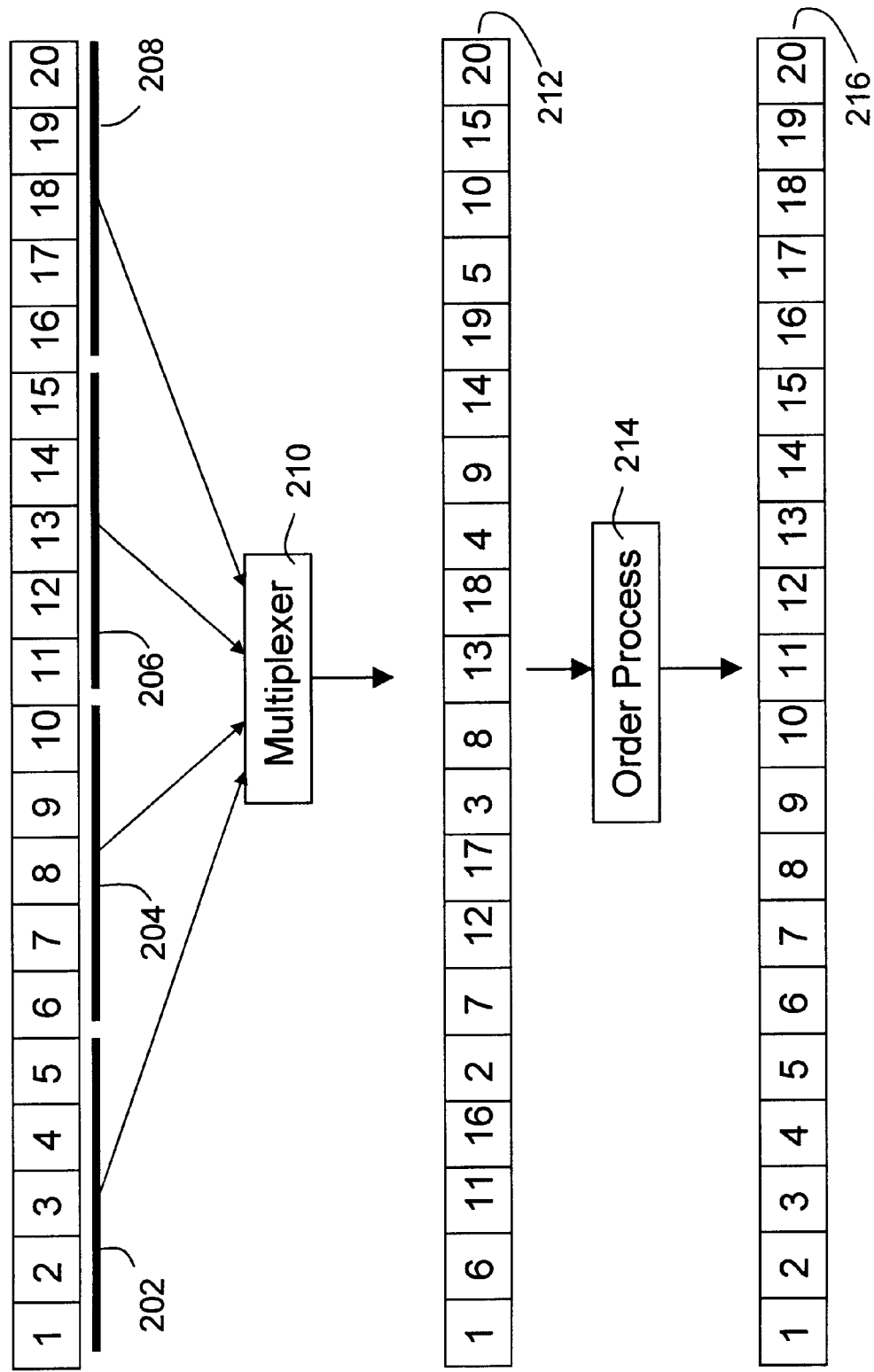
FIG. 6 demonstrates an interleaved scanning signal output from a multiplexer receiving a set of segmented scanning signal, which through an order circuitry produces a normal scanning signal.

The output VO from the multiplexer is, as described above, an interleaved scanning signal. Referring now to FIG. 6, there is illustrated an example of the process from four readout passages to produce the interleaved signal. There are four readout passages 202, 204, 206 and 208, each having five readout switches therein, respectively. The twenty pixels are labeled consecutively and from corresponding photodetectors in the image sensor. The consecutively numbered twenty pixels represent four segmented scanning signals from the four readout passages 202, 204, 206 and 208. When the four readout passages 202, 204, 206 and 208, controlled by their own clock signals, such as the CLKA, CLKB, CLKC, CLKD in FIG. 5, readouts respectively one pixel at one system clock cycle, as indicated by 183, 185, 187 and 189 caused by the corresponding downward edges 182, 184, 186 and 188 respectively in FIG. 5, the multiplexer 210 samples the four inputs sequentially, e.g. from OA to OD, and produces the interleaved signal 212. As indicated by the numbered pixels in the figure, the first, second, third and forth pixel are from the first pixel of the first, second, third and forth shift register, hence the interleaved scanning signal. Generally the interleaved scanning signal is difficult to visualize, an ordering process 214 may be used to reorder the pixels to produce a normal scanning signal 216 reflecting exactly what is captured in the photodetectors. It is understood to those skilled in the art that the reordering process can be implemented in the post-signal processing 108 or memory addressing in the memory 110 in FIG. 1.

The present invention has been described in sufficient detail with a certain degree of particularity. It is understood to those skilled in the art that the present disclosure of embodiments has been made by way of example only and that numerous changes in the arrangement and combination of parts as well as steps may be resorted s without departing from the spirit and scope of the invention as claimed. Accordingly, the scope of the present invention is defined by the appended claims rather than the forgoing description of one embodiment.

What is claimed is:

1. A sensing module for accelerating signal readout rate comprising:

an image sensor;

a timing circuit, in response to a clock signal having a clock cycle T, producing a plurality of control signals; wherein the control signals are respectively delayed by the clock cycle T;

a number of readout passages coupled to the image sensor and producing the same number of segmented scanning signals, each of the readout passages respectively and independently controlled by one of the control signals and producing one of the segmented scanning signals;

a multiplexer having the same number of inputs, each of the inputs respectively, receiving one of the segmented scanning signals and the multiplexer, in response to the clock signal, successively sampling the segmented scanning signals to produce an interleaved scanning signal.

2. The sensing module as recited in claim 1 further comprising an ordering process for reordering the interleaved scanning signal to a normal scanning signal.

3. The sensing module as recited in claim 1, wherein the image sensor comprises a plurality of photodetectors, each of the photodetectors respectively producing one pixel signal.

4. The sensing module as recited in claim 3, wherein the image sensor is a two-dimensional array of the photodetectors.

5. The sensing module as recited in claim 3, wherein the image sensor is a one-dimensional array of the photodetectors.

6. The sensing module as recited in claim 5, wherein each of the readout passages comprises a switch array and a local video bus, wherein the switch array comprises a plurality of readout switches, each of the readout switches being coupled to the local video bus and wherein each of the readout switches in each of the switch arrays is respectively coupled to each of the photodetectors in the image sensor.

7. The sensing module as recited in claim 6, wherein each of the readout passages produces, respectively, each of the segmented scanning signals by turning on sequentially the readout switches therein.

8. The sensing module as recited in claim 5, wherein each of the readout passages comprises a shift register comprising a plurality of memory cells, each of the memory cells receiving respectively one of the pixel signals from the photodetectors.

9. The sensing module as recited in claim 6, wherein each of the shift registers shifts out serially the pixel signal in each of the memory cells out, in response to one of the control signals, to produce respectively one of the segmented scanning signals.

10. A sensing module for accelerating signal readout rate comprising:

an image sensor having N photodetectors divided into M virtual groups; each of the virtual group having K photodetectors, wherein K=N/M;

a timing circuit, in response to a clock signal having a clock cycle T, producing M control signals, wherein each of the control signals has a period of T/M and wherein the control signals are successively and relatively delayed by the clock cycle T;

M readout passages producing, respectively and independently, M segmented scanning signals, each of the M readout passages coupled to one of the M virtual groups and controlled by one of the control signals from the timing circuit and producing one of the M segmented scanning signals; and a multiplexer having M inputs, each of the M inputs, respectively, receiving one of the M segmented scanning signals, the multiplexer, in response to the clock signal, individually and successively sampling the M segmented scanning signals to produce an interleaved scanning signal.

11. The sensing module as recited in claim 10, further comprising an ordering process for reordering the interleaved scanning signal to a normal scanning signal.

12. The sensing module as recited in claim 10, wherein each of the M readout passages, corresponding to one of the M virtual groups, comprises:

a local video bus communicating with one of the M inputs of the multiplexer; and K readout switches, each coupling one of the N photodetectors in one of the M virtual groups, to the local bus.

13. The sensing module as recited in claim 12, wherein each of the N photodetectors produces a pixel signal when being exposed to a light and wherein the local video bus takes K*T cycles to receive K pixel signals from the respective K photodetectors to subsequently produce one of the M segmented scanning signals.

14. The sensing module as recited in claim 13, wherein the K readout switches are, sequentially and respectively, turned on by one of the control signals from the timing circuit, to readout the K pixel signals to the local bus.

15. The sensing module as recited in claim 10, wherein each of the N photodetectors produces a pixel signal when being exposed to light and wherein each of the M readout passages, corresponding to one of the M virtual groups, comprises M shift registers coupled to the image sensor and, each of the M shift registers, respectively and independently, controlled by one of the controlled signals.

16. The sensing module as recited in claim 15, wherein each of the M shift registers comprises K memory cells, each of the K memory cells holding the pixel signal from one of the N photodetectors.

17. The sensing module as recited in claim 16, wherein each of the M shift registers produces one of the segmented scanning signals by shifting out the pixel signal from one of the K memory cells to another one of the K memory cells at the clock T.

18. The sensing module as recited in claim 17, wherein each of the M shift registers takes K*T cycles to shift out K pixel signals from the K memory cells to subsequently produce one of the M segmented scanning signals.

* * * * *